Jan. 19, 1932. A. W. YOUNG 1,842,057
POWER GOVERNOR
Filed March 6, 1929
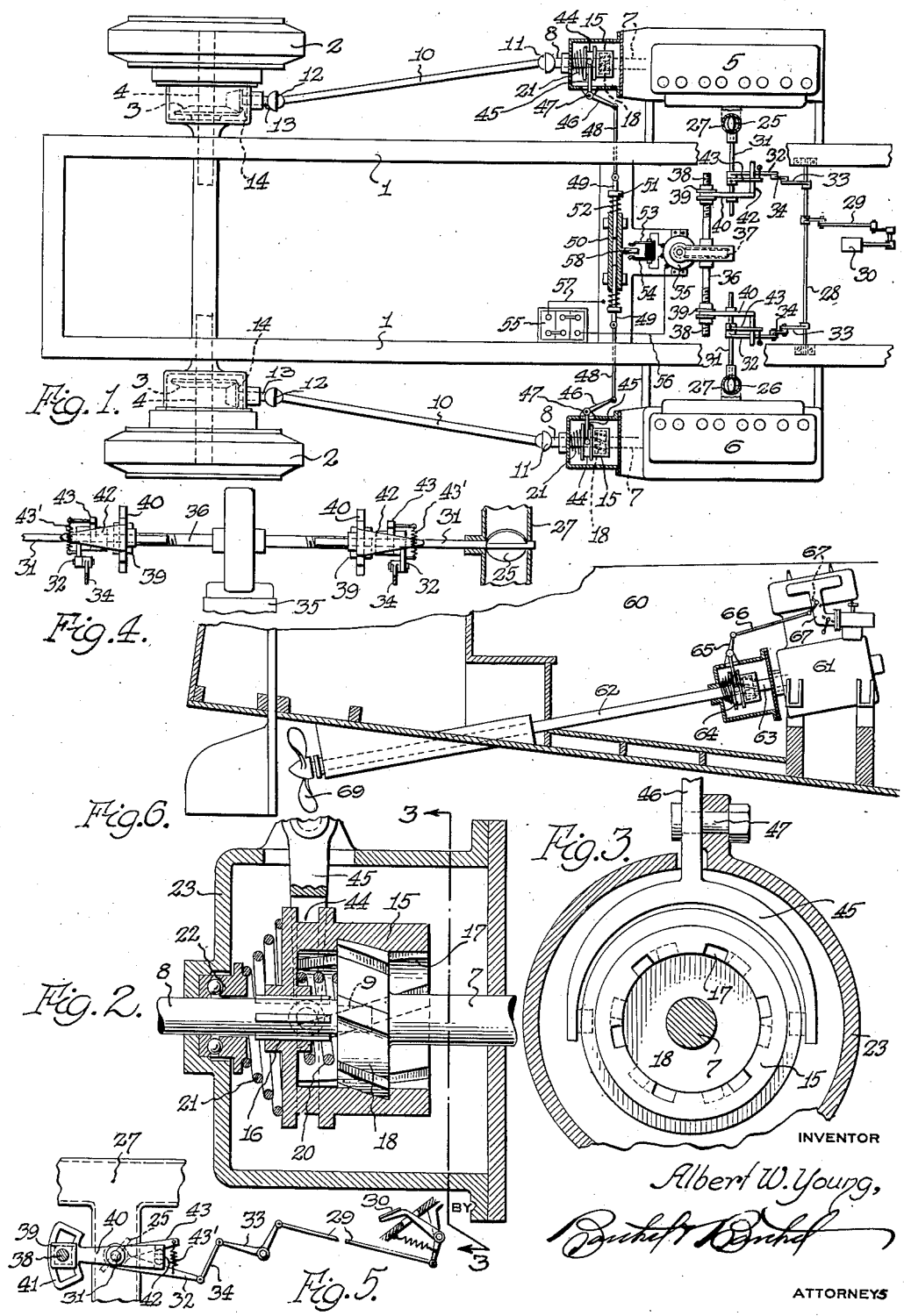

Patented Jan. 19, 1932

1,842,057

UNITED STATES PATENT OFFICE

ALBERT W. YOUNG, OF MUSKEGON, MICHIGAN

POWER GOVERNOR

Application filed March 6, 1929. Serial No. 344,885.

The present invention pertains to a novel power governor for controlling the output of motors. The principal object of the invention is to provide a device of this character which controls the power output of a motor in proportion to the load thereon. In the case of a gasoline engine, the governor acts on the fuel admission valve, opening the valve when the load increases, and closing it as the load diminishes.

Another object of the invention is to provide a balancing means for a twin motor installation such as used on trucks and motorboats. Particularly in the former instance, the loads on the two motors are unequal when the vehicle makes a turn, in which case the outer drive wheel runs ahead of the motor and the inner wheel lags by reason of its carrying a greater load. The invention as a balancing device between twin motors further overcomes inequalities in output due to a difference in the efficiencies of the motors, resulting from different adjustments of the carburetors, leaking valves and other inequalities of adjustment, wear or operation.

The invention is fully disclosed by way of example in the following description and in the accompanying drawings, in which—

Figure 1 is a plan view, partly in section, of the invention applied to a twin motor truck;

Fig. 2 is a detail section of one of the couplings between a drive and a driven shaft;

Fig. 3 is a section on the line 3—3 of Figure 2;

Fig. 4 is a detail transverse section of Figure 1, showing the valve actuating mechanism;

Fig. 5 is a detail longitudinal section of Figure 1, and

Fig. 6 is a fragmentary longitudinal section of a motorboat equipped according to the invention.

Reference to these views will now be made by use of like characters which are employed to designate corresponding parts throughout.

In Figure 1 is shown a motor vehicle comprising a chassis 1, the rear wheels 2 of which are separately driven at bevel gears 3 on their respective axles 4. The wheels are separately propelled by motors 5 and 6 at the forward part of the chassis.

Each motor has a drive 7 in line with which is a driven shaft 8 having a reduced end 9 received loosely in an end of the shaft 7. A connecting shaft 10 has its ends joined by universal joints 11 and 12 to a shaft 8 and a stub shaft 13 respectively at one side of the vehicle, the latter stub shaft carrying a pinion 14 meshing with the bevel gear 3.

The driving connection between the shafts 7 and 8 includes a cup member 15 splined on the latter as at 16 and extending over the end of the shaft 7. The cup member is formed internally with a long thread 17, and to the end of the shaft 7 is fixed a screw member 18 adapted to turn, under certain conditions, relatively to the thread of the member 19. Between the base of the cup member and the screw member 18 is inserted a spring 20 adapted normally to maintain a given resistance against the further entrance of the screw member into the cup. This spring is balanced by another spring 21 engaging the base of the cup externally and also bearing against a ball bearing 22 in which the shaft 8 rotates. This coupling member is enclosed in a housing 23 surrounding the shafts 7 and 8 and supporting the bearing 22. The housings are attached to their respective motors 5 and 6 as shown in Figure 1.

The motors 5 and 6 have power controls, illustrated in the present instance by butterfly valves 25 and 26 respectively in the fuel intake pipes 27. Across the forward part of the chassis is journalled a rod 28 adapted to be turned by linkage 29 extending to the usual accelerator pedal 30. The valve rods 31 of the valves 25 and 26 are connected separately to the rod 28 by linkages, each of which includes arms 32 and 33 journalled respectively on the rods 31 and 28 and joined by an intermediate link 34.

The actuating mechanism for the controls 25 and 26 includes a reversible motor 35 which drives a double ended screw 36 through suitable gearing 37. The ends of the screw are threaded parallel, as at 38, and on these ends are mounted grooved nuts 39. On the stems 31 are slidably mounted rocker arms 40 having at one end an enlarged slotted portion 41 curved on a radius from the center of the stem 31 and received in the groove of one of the nuts, while the other end carries a wedge 42 lying on the corresponding arm 32 and engaged at its upper inclined edge by a finger 43 fixed to the stem 31 and drawn against the wedge by a spring 43' connected to the arm 32.

Each cup member 15 has an outer bevel groove 44 in which are received the ends of a yoke 45 having an angular or bell crank neck 46 swiveled on a pin 47 fixed to the housing 23. Rods 48 extend inwardly from the members 46, passing slidably through the sides of the chassis, and carry at their ends swiveled stems 49 which slidably enter the ends of a tubular carrier member 50. The stems 49 have collars 51, and each stem is surrounded partly by a spring 52 disposed between the collar and the adjacent end of the member 50, whereby the latter is spring balanced by the collars 51.

The motor 35 is equipped with a two-way switch including contact 53 and 54, which, when engaged by the movable element of the switch, cause the motor to turn in opposite directions. Current is supplied to the motor from a battery 55 having one of its terminals wired to the motor as at 56. The other terminal is wired to the carrier 50 by a conductor 57. The carrier 50 supports the movable element 58 of the two-way switch, this element being adapted to engage the contacts 53 and 54 selectively.

In the operation of the device, let it be assumed that the lefthand wheel in Figure 1 has a lighter load than the other wheel, for any of the reasons stated in the introduction to this specification. Since the movement of the vehicle is retarded by the wheel having the heavier load, the faster wheel 4 and the driven shaft 8 associated therewith will tend to overrun or turn at a greater angular velocity than the corresponding drive shaft 7. The difference in speeds between the shafts 7 and 8 causes the cup 15 to be pulled up on the screw member 18 against the action of the spring 20 which is of such strength as to hold the members 15 and 18 apart when turning at equal speeds. The shifting of the cup 15 in the manner described turns the bell crank member 46 to shift the rod 48 and hence the carrier 50 so that the movable contact 58 engages one of the contacts 53 or 54 to start the motor 35. The rotation of the motor under these conditions is such that the nut 39 corresponding to the side of the vehicle having the fastener moving wheel, moves its wedge 42 towards the corresponding valve 25. The arm 32 is stationary, and the wedge therefore turns the arm 43 and the stem 31 to reduce the opening at the valve 25. At the same time, the other wedge is retracted to increase the opening at the other valve 26, whereby the motors are controlled to deliver power proportional to the loads at the corresponding wheels 2. In this sense the screw 36 may be said to act reversely on the valves 25 and 26, and it may be noted in this connection that these valves are merely representative of any desired type of motor control. In like manner, the shaft 8 carrying the heavier load will lag behind its drive shaft 7, thus causing a retraction between the coupling parts 15 and 18 and producing movement of the carrier 50 cumulative to, or in the same direction as, that produced by the wheel with the smaller load.

Due to the fact that the controls 25 and 26 are operated by members threaded on the double screw 36, any particular setting of the controls in response to conditions at the wheels will remain, notwithstanding breaking of the motor circuit, until the circuit is again closed in one direction or the other.

It will now be observed that if the load relations at the wheels 4 are reversed from the condition described, the respective coupling members will operate reversely, thereby causing the carrier 50 to shift in the opposite direction and the motor to turn in the direction opposite to that described, with the result that a similar power compensation occurs between the motors 5 and 6. It will also be apparent that the operation of this mechanism is such as to maintain a balanced condition between the motors with respect to the loads thereon.

In the usual acceleration of the engines from the pedal 30, the rod 31 is turned, locking both arms 32 and lifting both wedges 42 and fingers 43, regardless of their respective adjustments, whereby the valve stems 31 are turned. The movement of the fingers 43 to which the rocker arms 40 are attached is permitted, notwithstanding the connection of the rocker arms to the nuts 39, by the curved arcuate slots 41 on the arms for receiving the nuts.

Figure 6 illustrates the invention applied to a motorboat 60 having a single motor 61. The propeller shaft 62 is connected to the motor shaft 63 by a coupling unit of the character described and indicated by the numeral 64. The bell crank member 65 corresponding to the member 46 of Figure 1 and operated by the cup member of the coupling is linked as at 66 to a motor control such as a valve 67 in the fuel intake pipe 68. Thus, when the propeller 69 rises out of the water and the motor tends to race, this tendency is avoided by the action of the coupling member which displaces the bell crank member 65 and cuts down the fuel charge to the motor.

Although specific embodiments of the invention have been illustrated and described, it will be understood that various alterations in the details of construction may be made without departing from the scope of the invention, as indicated by the appended claims.

What I claim is:—

1. A device of the character described comprising a drive shaft and a driven shaft, movable and fixed members on said shafts having the relation of a screw and nut, a motor for driving said drive shaft and having an input control, operating linkage between said movable member and said control, and balancing springs at opposite sides of said movable member.

2. A device of the character described comprising a drive shaft and a driven shaft, movable and fixed members on said shafts having the relation of a screw and nut, a motor for driving said drive shaft and having a fuel control, operating linkage between said movable member and said control, and balancing springs at opposite sides of said movable member.

3. A device of the character described comprising a drive shaft and a driven shaft, a fixed member and a spring balanced movable member on said shafts having the relation of a screw and nut, a motor for driving said drive shaft and having an input control, operating linkage between said movable member and said control, and balancing springs at opposite sides of said movable member.

4. In combination with a pair of motors, drive shafts extending therefrom, driven shafts associated with said drive shafts, connecting means between the drive shafts and the driven shafts comprising fixed and movable members thereon having the relation of a screw and nut, input controls for said motors, an operating member adapted to act oppositely on said controls, and a reversible drive member for said operating member connected to said movable members.

5. In combination with a pair of motors, drive shafts extending therefrom, driven shafts associated with said drive shafts, connecting means between the drive shafts and the driven shafts comprising fixed and movable members thereon having the relation of a screw and nut, input controls for said motors, an operating member adapted to act oppositely on said controls, a reversible motor for driving said operating member, a two-way switch for controlling said motor, said switch having a movable element connected to said movable members.

6. In combination with a pair of motors, drive shafts extending therefrom, driven shafts associated with said drive shafts, connecting means between the drive shafts and the driven shafts comprising fixed and movable members thereon having the relation of a screw and nut, input controls for said motors, a rotatable screw adapted to act oppositely on said controls, and a reversible drive member for said operating member connected to said movable members.

7. In combination with a pair of motors, drive shafts extending therefrom, driven shafts associated with said drive shafts, connecting means between the drive shafts and the driven shafts comprising fixed and movable members thereon having the relation of a screw and nut, input controls for said motors, a rotatable screw adapted to act oppositely on said controls, a reversible motor for driving said operating member, a two-way switch for controlling said motor, said switch having a movable element connected to said movable members.

8. In combination with a pair of motors, drive shafts extending therefrom, driven shafts associated with said drive shafts, connecting means between the drive shafts and the driven shafts comprising fixed and movable members thereon having the relation of a screw and nut, input controls for said motors, an operating member adapted to act oppositely on said controls, a reversible motor for driving said operating member, a two-way switch for controlling said motor, said switch having a movable element, and a carrier movable by said movable members and supporting said movable switch element.

In testimony whereof I affix my signature.

ALBERT W. YOUNG.